(12) United States Patent
Roth et al.

(10) Patent No.: US 7,467,328 B2
(45) Date of Patent: Dec. 16, 2008

(54) KERNEL CONFIGURATION RECOVERY

(75) Inventors: Steven T. Roth, Sunnyvale, CA (US); Aswin Chandramouleeswaran, Santa Clara, CA (US); C. P. Vijay Kumar, Sunnyvale, CA (US); Douglas K. Eldred, Fort Collins, CO (US); Lisa M. Nishiyama, Sunnyvale, CA (US); Arun Krishna, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 826 days.

(21) Appl. No.: 10/934,506

(22) Filed: Sep. 3, 2004

(65) Prior Publication Data

US 2006/0053272 A1 Mar. 9, 2006

(51) Int. Cl.
G06F 11/00 (2006.01)
G06F 11/08 (2006.01)
G06F 11/22 (2006.01)

(52) U.S. Cl. .............................. 714/15; 714/6; 714/36
(58) Field of Classification Search ................ 714/1–57
See application file for complete search history.

(56) References Cited

U.S. PATENT DOCUMENTS

| | | | |
|---|---|---|---|
| 6,173,417 B1 * | 1/2001 | Merrill .................... 714/15 |
| 6,253,320 B1 * | 6/2001 | Sekiguchi et al. .............. 713/2 |
| 6,665,813 B1 * | 12/2003 | Forsman et al. ............... 714/15 |
| 6,751,715 B2 * | 6/2004 | Hubbard et al. ............. 711/162 |
| 6,907,512 B2 * | 6/2005 | Hill et al. .................... 711/207 |
| 6,912,662 B1 * | 6/2005 | McCall et al. ................ 726/26 |
| 7,100,087 B2 * | 8/2006 | Yang et al. .................... 714/36 |
| 7,143,281 B2 * | 11/2006 | Chandramouleeswaran et al. .................... 713/100 |
| 7,191,322 B2 * | 3/2007 | Millward et al. .............. 713/1 |
| 7,216,251 B2 * | 5/2007 | Gaunt et al. .................... 714/6 |
| 7,246,200 B1 * | 7/2007 | van Rietschote et al. .... 711/114 |
| 7,302,561 B2 * | 11/2007 | Chandramouleeswaran et al. .................... 713/100 |
| 7,313,685 B2 * | 12/2007 | Broyles et al. ................. 713/2 |
| 7,318,173 B1 * | 1/2008 | Falik et al. .................... 714/36 |
| 7,370,289 B1 * | 5/2008 | Ebert et al. ................. 715/864 |
| 2001/0034762 A1 * | 10/2001 | Jacobs et al. ................ 709/204 |
| 2002/0023211 A1 * | 2/2002 | Roth et al. ................... 713/164 |
| 2004/0255106 A1 * | 12/2004 | Rothman et al. ............... 713/1 |

* cited by examiner

Primary Examiner—Scott T. Baderman
Assistant Examiner—Joseph Schell

(57) ABSTRACT

Systems, methods, and devices are provided for kernel configurations. One embodiment includes a kernel configuration tool, a system file accessible by the kernel configuration tool, and means for recovering kernel configurations without the use of a manually creating a "known good post update" kernel configuration.

44 Claims, 9 Drawing Sheets

KERNEL CONFIGURATION RECOVERY

BACKGROUND

Before a computing device may accomplish a desired task, it must receive an appropriate set of instructions. Executed by a device's processor(s), these instructions direct the operation of the device. These instructions can be stored in a memory of the computer. Instructions can invoke other instructions.

A computing device, such as a server, router, desktop computer, laptop, etc., and other devices having processor logic and memory, includes an operating system layer and an application layer to enable the device to perform various functions or roles. The operating system layer includes a "kernel", i.e., master control program, that runs the computing device. The kernel provides task management, device management, and data management, among others.

The kernel sets the standards for application programs that run on the computing device and controls resources used by application programs. The application layer includes programs, i.e., executable instructions, which are located above the operating system layer and accessible by a user. As used herein, "user" space, or "user-mode" implies a layer of code which is less privileged and more directly accessible by users than the layer of code which is in the operating system layer or "kernel" space.

In software development, there can be many different groups of programmers working on different portions of software code that will later be compiled to create a finished program. A compiler is software that converts a set of high-level language statements (e.g., high level programming language such as C/C++, COBOL, etc.) into a lower-level representation. For example, compiler software translates a program written in a high-level programming language (C/C++, COBOL, etc.) into machine language. A compiler may generate assembly language first and then translate the assembly language into machine language. A utility known as a "linker" then combines all required machine language modules into an executable program that can run in the computer.

In an operating system parlance, the kernel is the set of modules forming the core of the operating system. The kernel is loaded into main memory first on startup of a computer and remains in main memory providing services such as memory management, process and task management, and disk management. The kernel also handles such issues as startup and initialization of the computer system. Logically, a kernel configuration is a collection of all the administrator choices and settings needed to determine the behavior and capabilities of the kernel. This collection includes a set of kernel modules (each with a desired state), a set of kernel tunable parameter value assignments, a primary swap device, a set of dump device specifications, a set of bindings of devices to other device drivers, a name and optional description of the kernel configuration, etc.

The process of configuring an operating system kernel, i.e., kernel configuration, has some possibility for error, potentially leaving a system unusable. There are various techniques to mitigate this danger. The most common of these techniques is the creation of backups of the kernel configuration before changing it, and restoring those backups if the configuration change proves undesirable. This technique is adequate in most cases, but if the ill effects of the configuration change are significant, the backup can be damaged, or damage can be done to parts of the system not normally backed up.

System administrators have an understandable nervousness about making configuration changes on a live production system, e.g., one on which many users are depending. System upgrades and brand new installs can both present these issues.

Additional issues in configuring an operating system kernel include the incorrect use of kernel configuration tools which could result in no working bootable configuration, manual manipulation of kernel configurations based on familiarity with earlier versions or different supplier's products, post boot changes, etc. In some cases a system administrator may forget to make backups, fail to properly keep track of backups, and/or fail to make complete backup copies of kernel configurations, e.g., all of the relevant files may not be included in the backup.

DETAILED DESCRIPTION

Program instructions are provided which execute in association with kernel configurations. A program embodiment is provided which executes instructions such that after a new kernel has booted successfully at least once, whether in association with an operating system installation or update, a kernel configuration is automatically saved as "last install". The last install configuration will be a "known good" kernel configuration and help to avoid issues when a user inadvertently creates a non-bootable kernel configuration and has not created a backup. A program embodiment is provided which executes instructions to make a copy of one or more key file systems of a running system. Program instructions execute to apply kernel configuration changes to the copy. The system can be restarted using the kernel configuration changes on the copy. If issues arise, the program instructions can execute to restart the system using the one or more key file systems from which the copy was originally made.

Additionally, a program embodiment is provided which executes instructions to facilitate a failsafe boot mode. Program instructions execute, when booting in a failsafe mode, to provide failsafe values to tunables, to use default device bindings, and to prohibit dynamically loading kernel modules during boot. And, program embodiments are provided which execute instructions to enable and disable an automatic saving of a backup kernel configuration. These and other embodiments will be appreciated by one of ordinary skill in the art upon reading this disclosure.

Figure 1:
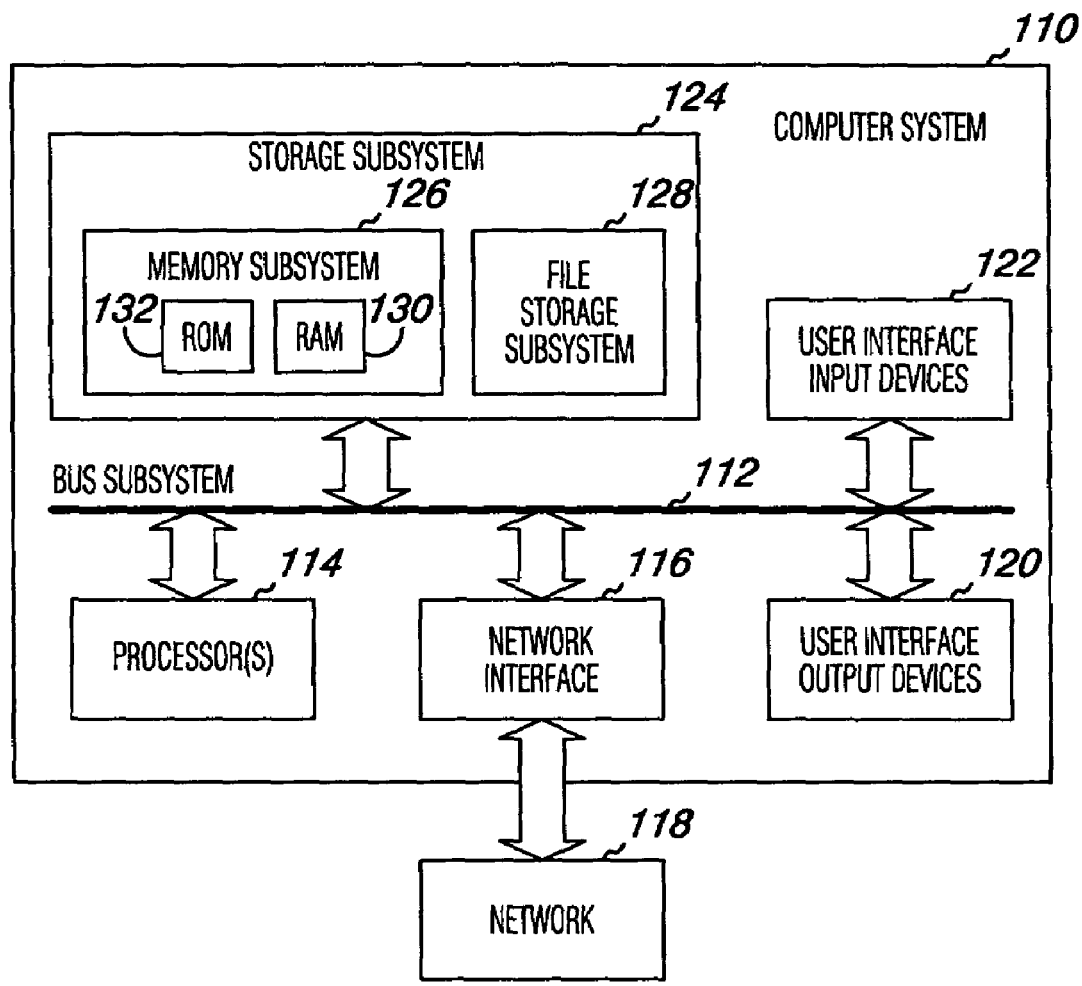
FIG. 1 is a block diagram of a computer system suitable to implement embodiments of the invention.

FIG. 1 is a block diagram of a computer system 110 suitable to implement embodiments of the invention. Computer system 110 includes at least one processor 114 which communicates with a number of other computing components via bus subsystem 112. These other computing components may include a storage subsystem 124 having a memory subsystem 126 and a file storage subsystem 128, user interface input devices 122, user interface output devices 120, and a network interface subsystem 116, to name a few. The input and output devices allow user interaction with computer system 110. Network interface subsystem 116 provides an interface to outside networks, including an interface to network 118 (e.g., a local area network (LAN), wide area network (WAN), Internet, and/or wireless network, among others), and is coupled via network 118 to corresponding interface devices in other computer systems. Network 118 may itself be comprised of many interconnected computer systems and communication links, as the same are known and understood by one of ordinary skill in the art. Communication links as used herein may be hardwire links, optical links, satellite or other wireless communications links, wave propagation links, or any other mechanisms for communication of information.

User interface input devices 122 may include a keyboard, pointing devices such as a mouse, trackball, touchpad, or graphics tablet, a scanner, a touchscreen incorporated into a display, audio input devices such as voice recognition systems, microphones, and other types of input devices. In general, use of the term "input device" is intended to include all possible types of devices and ways to input information into computer system 110 or onto computer network 118.

User interface output devices 120 may include a display subsystem, a printer, a fax machine, or non-visual displays such as audio output devices. The display subsystem may be a cathode ray tube (CRT), a flat-panel device such as a liquid crystal display (LCD) and/or plasma display, or a projection device (e.g., a digital light processing (DLP) device among others). The display subsystem may also provide non-visual display such as via audio output devices. In general, use of the term "output device" is intended to include all possible types of devices and ways to output information from computer system 110 to a user or to another machine or computer system 110.

Storage subsystem 124 can include the operating system "kernel" layer and an application layer to enable the device to perform various functions, tasks, or roles. File storage subsystem 126 can provide persistent (non-volatile) storage for additional program and data files, and may include a hard disk drive, a floppy disk drive along with associated removable media, a compact digital read only memory (CD-ROM) drive, an optical drive, or removable media cartridges. Memory subsystem 128 typically includes a number of memories including a main random access memory (RAM) 130 for storage of program instructions and data during program execution and a read only memory (ROM) 132 in which fixed instructions are stored. As used herein, a computer readable medium is intended to include the types of memory described above. Program embodiments as will be described further herein can be included with a computer readable medium and may also be provided using a carrier wave over a communications network such as the Internet, among others.

Bus subsystem 112 provides a mechanism for letting the various components and subsystems of computer system 110 communicate with each other as intended. Although bus subsystem 112 is shown schematically as a single bus, alternate embodiments of the bus subsystem 112 may utilize multiple busses.

Program embodiments according to the present invention can be stored in the memory subsystem 126, the file storage subsystem 128, and/or elsewhere in a distributed computing environment as the same will be known and understood by one of ordinary skill in the art. Due to the ever-changing nature of computers and networks, the description of computer system 110 depicted in FIG. 1 is intended only as one example of a computing environment suitable for implementing embodiments of the present invention. Many other configurations of computer system 110 are possible having more or less components than the computer system depicted in FIG. 1.

Computing networks can include multiple computing devices such as servers, desktop PCs, laptops, and workstations, among other peripheral devices, e.g., printers, facsimile devices, and scanners, networked together across a local area network (LAN) and/or wide area network (WAN). A LAN and/or WAN uses clients and servers that have network-enabled operating systems such as Windows, Mac, Linux, and Unix. An example of a client includes a user's workstation. Clients and servers can be connected in a client/server relationship in which the servers hold programs and data that are shared by the clients in the computing network.

As mentioned above, the kernel layer of a computer system manages the set of processes that are running on the system by ensuring that each process is provided with processor and memory resources at the appropriate time. A process refers to a running program, or application, with input, output, and a state. The kernel provides a set of services that allow processes to interact with the kernel and to simplify the work of an application writer. The kernel's set of services is expressed in a set of kernel modules. A module is a self contained set of instructions designed to handle particular tasks within a larger program. Kernel modules can be compiled and subsequently linked together to form a kernel. Other types of modules can be compiled and subsequently linked together to form other types of programs. As used herein an operating system of a computer system can include a Unix, Linux, AIX, Windows, and/or Mac operating system, etc.

Figure 2A:
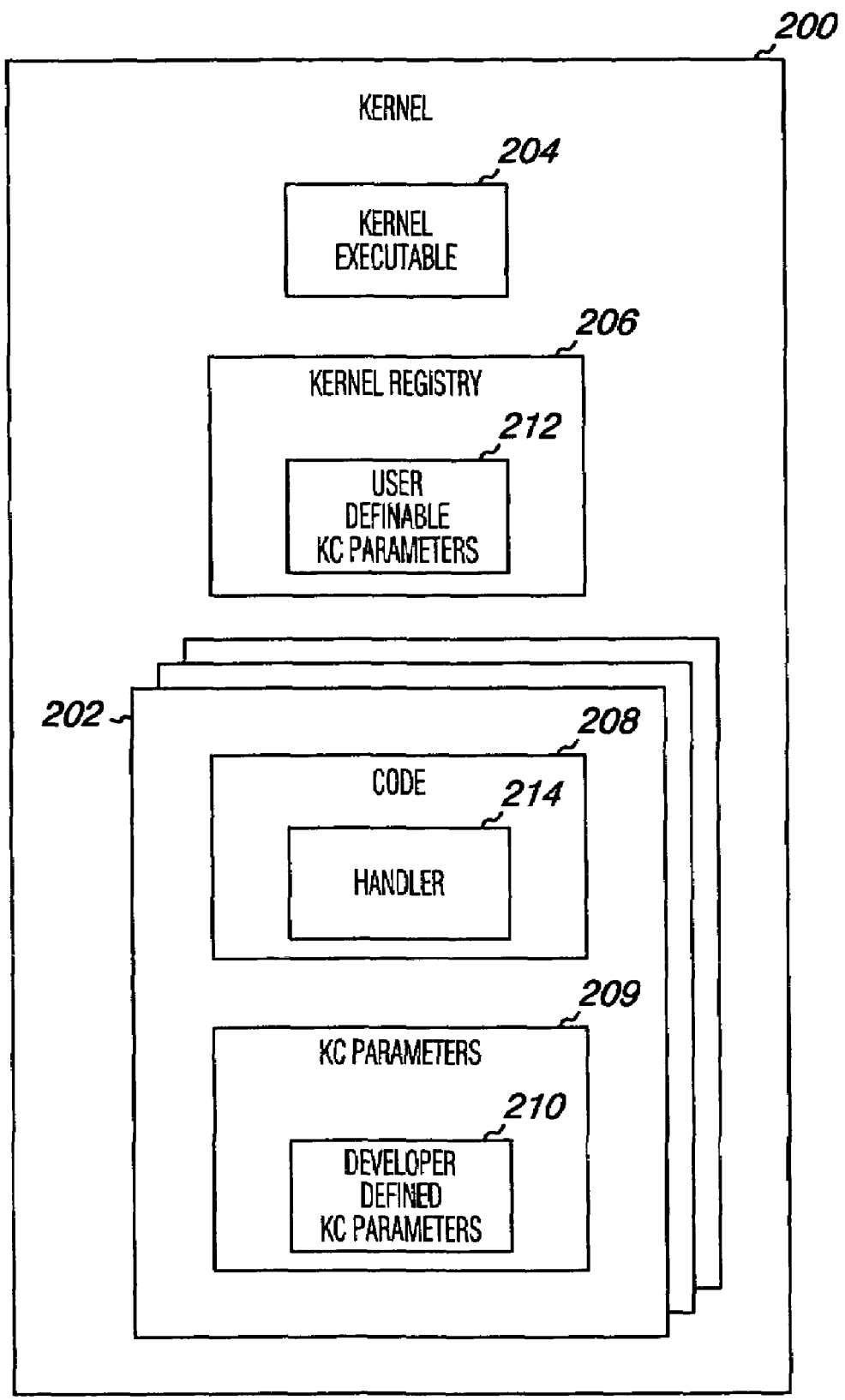
FIG. 2A illustrates a kernel having a number of modules.

FIG. 2A illustrates a kernel configuration 200 having a number of modules 202. As one of ordinary skill in the art will appreciate, once a set of modules are created in a development environment for an kernel configuration 200 they are shipped from a supplier to a user or customer. Developer provided, kernel configuration (KC) parameters 209 can be made available to a system user, e.g., system administrator. Some kernel configuration parameters 209 are set by the kernel developer (illustrated as 210), and cannot easily be changed subsequent to installation of the operating system kernel. Others may be changed by a system user, e.g., system administrator, (illustrated as 212). As mentioned above, logically a kernel configuration is a collection of all the administrator choices and settings needed to determine the behavior and capabilities of the kernel. This collection includes a set of kernel modules (each with a desired state), a set of kernel tunable parameter value assignments, a primary swap device, a set of dump device specifications, a set of bindings of devices to other device drivers, a name and optional description of the kernel configuration, etc.

Physically, a kernel configuration 200 is a directory that contains the files needed to realize a desired behavior for the operating system. The directory includes: a kernel executable 204, a set of kernel modules files 202, and a kernel registry database 206 (containing the logical setting described above). As illustrated in FIG. 2A each kernel module 202 includes kernel code 208 and kernel configuration (KC) parameters 209 (some developer defined 210 and some user definable 212 as illustrated in the kernel registry database 206). The kernel code 208 includes a kernel configuration handler function 214 which controls the kernel configuration parameters 209. Kernel tunables are one example of kernel configuration parameters 209 which control some behavior of the operating system kernel. The tunable parameters are integer values used to define how the kernel is to behave. For example, tunable values can include a setting for the number of processes for each user on a system, a setting for a total number of processes on the system, security features, etc. The tunable values are initialized by a tunable initialization function, which is part of the kernel code 208. Kernel tunable parameters are usually managed manually. Some tunable value changes, e.g. by a system administrator, can be implemented immediately to a running system, others cannot and some can only be implemented through rebooting the system. For example, it is not possible to immediately reduce the value of some resource below a current usage. When a kernel configuration parameter change, e.g., tunable value change, cannot be implemented immediately, the kernel may hold the value change in the kernel registry 206 and apply it at a later time, e.g., a next reboot.

In one example Unix environment, the operating system kernel is a collection of around 350 kernel modules and has as many as 200 kernel tunables. This example environment is discussed herein for ease of illustration. However, the reader will appreciate that embodiments are not limited to a Unix operating system environment. In this Unix example, the kernel configuration parameters are managed by three commands known as kconfig, kcmodule, and kctune. Kconfig is used to manage whole kernel configurations. It allows configurations to be saved, loaded, copied, renamed, deleted, exported, imported, etc. It can also list existing saved configurations and give details about them. Kcmodule is used to manage kernel modules. Kernel modules can be device drivers, kernel subsystems, or other bodies of kernel code. Each module can have various module states, including unused, static, and/or dynamic (which can include both "loaded", i.e., the module is dynamically loaded into the kernel, and "auto", i.e., the module will be dynamically loaded into the kernel when it is first needed, but has not been yet). That is, each module can be unused, statically bound into the main kernel executable, or dynamically loaded. These states may be identified as the states describing how the module will be used as of the next system boot and/or how the module is currently being used in the running kernel configuration. Kcmodule will display or change the state of any module in the currently running kernel configuration or a saved configuration. Kctune is used to manage kernel tunable parameters. As mentioned above, tunable values are used for controlling allocation of system resources and tuning aspects of kernel performance. Kctune will display or change the value of any tunable parameter in the currently running configuration or a saved configuration.

Kernel configuration commands can be part of a unified suite meaning that they share behavior whenever possible. Shared behaviors include command line flags, output formats, exit status codes, security constraints, and persistence of changes. Command line flags are shared by the kernel configuration commands. Thus, in the example Unix environment, the kernel configuration commands kconfig, kcmodule, and kctune share certain command line flags. In the Unix environment, -B and -K are two example command line flags which are shared by all three of the kernel configuration commands kconfig, kcmodule, and kctune. According to various embodiments, as will be illustrated in more detail in connection with FIGS. 4-7, the -B flag (or equivalent construct) instructs the system to back up the currently running kernel configuration before applying changes to the kernel configuration. The -K flag (or equivalent construct) instructs the system to "keep" the currently existing kernel configuration backup unmodified, i.e., to not back up the currently running kernel configuration.

Figure 2B:
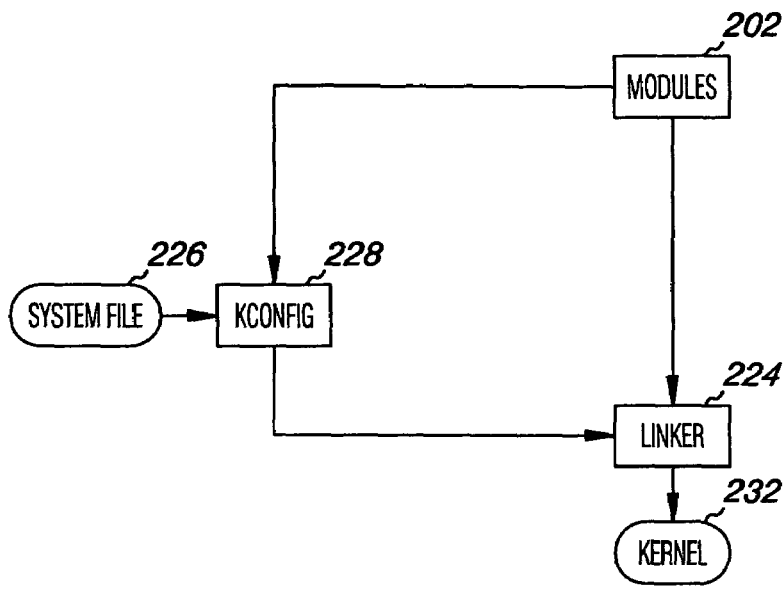
FIG. 2B is a block diagram of an embodiment of a kernel build system suitable to implement embodiments of the invention.

FIG. 2B is a block diagram of an embodiment of a kernel build system suitable to implement embodiments of the invention. As shown in the example illustration of FIG. 2B, a system user, e.g., a system administrator, may be provided with access to a kernel (such as kernel 200 shown in FIG. 2A) as part of installing, updating (upgrading), and/or managing an operating system kernel on a system. As noted above, once a set of modules are created in a development environment for an operating system kernel 200 they are shipped from a supplier to a user or customer. As illustrated in FIG. 2B, the modules in the kernel, e.g., 202 in FIG. 2A, which are sold and shipped to a customer can be provided to a linker utility 224 that is used to join modules together to make a program, e.g., kernel, for the particular customer's system. This part of the process may be performed in either the development environment or the runtime environment, i.e., on a customer system. As illustrated in the embodiment of FIG. 2B, a system user may be provided with a kernel configuration tool, shown as kconfig 228, which executes program instructions to implement the embodiments described in further detail below. The kconfig tool 228 can read the modules, e.g., 202 in FIG. 2A, in the developer provided kernel 200 to find out what modules are available. As illustrated in FIG. 2B, the linker 224 can receive instructions from the kconfig 228 tool. The kconfig tool 228 can allow a system administrator to specify tunable variables, i.e., values that control the behavior of the modules, etc. Such administrator chosen values can be contained in customer system files 226. The customer supplied "system file" 226 also specifies which modules the customer wants to use. The result of this process is a complete program, e.g., kernel file 232, that the customer can install on and use to run their system.

Figure 2C:
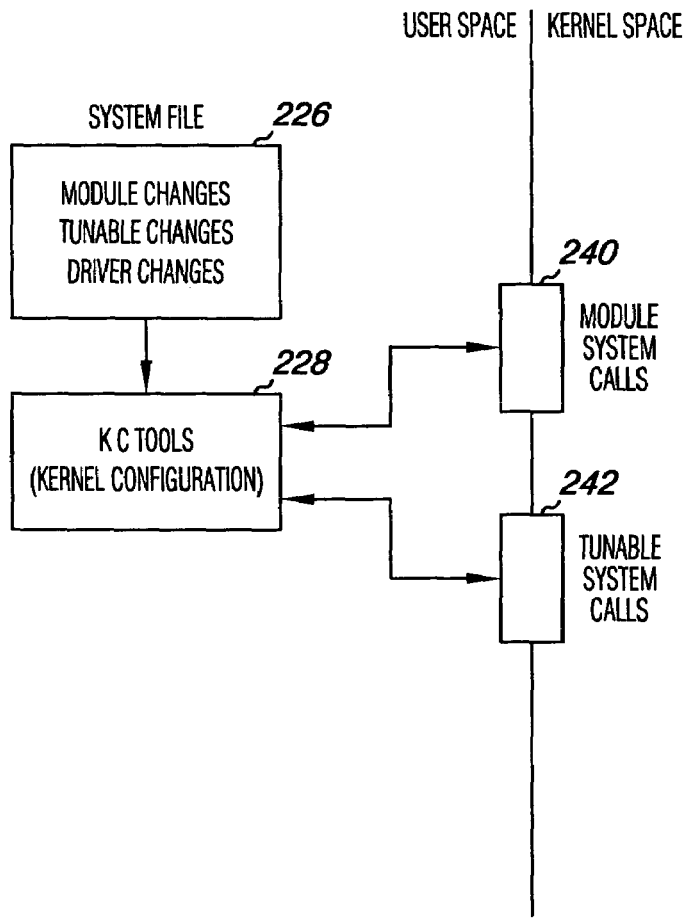
FIG. 2C is a block diagram of an embodiment of a kernel configuration change.

FIG. 2C is a block diagram of an embodiment of a kernel configuration change delineating between user space and kernel space. As noted above, a system user, e.g., a system administrator, may be provided with access to a kernel 200 as part of installing, updating (upgrading), and/or managing an operating system kernel on a system. As the reader will appreciate, some kernel configuration parameter changes can be implemented by a system user, e.g. by a system administrator, on a running system, i.e. without having to reboot the system or re-link modules. Some kernel configuration parameters can even be implemented immediately to a running system. FIG. 2C shows a system file 226 illustrating example module changes, tunable changes, driver changes, etc., e.g., by a system administrator. As shown in FIG. 2C, kernel configuration tools 228, such as described herein, can execute program instructions to implement these changes in kernel space via module system calls 240, tunable system calls 242, etc. For example, such kernel configuration changes can be implemented using the kcmodule and kctune commands described above.

As mentioned in the background, the process of configuring an operating system kernel, i.e., kernel configuration, has some possibility for error, potentially leaving a system unusable. There are various techniques to mitigate this danger. The most common of these techniques is the creation of backups of the kernel configuration before changing it, and restoring those backups if the configuration change proves undesirable. This technique is adequate in most cases, but if the ill effects of the configuration change are significant, the backup can be damaged, or damage can be done to parts of the system not normally backed up. System administrators have an understandable nervousness about making configuration changes on a live production system, e.g., one on which many users are depending. System upgrades and brand new installs can both present these issues.

As will be described in what follows, program embodiments are provided to a computer system, e.g., via a configuration tool. These various program embodiments execute instructions in association with operating system kernel installation and kernel configuration changes to reduce concern with the above mentioned issues.

Figure 3:
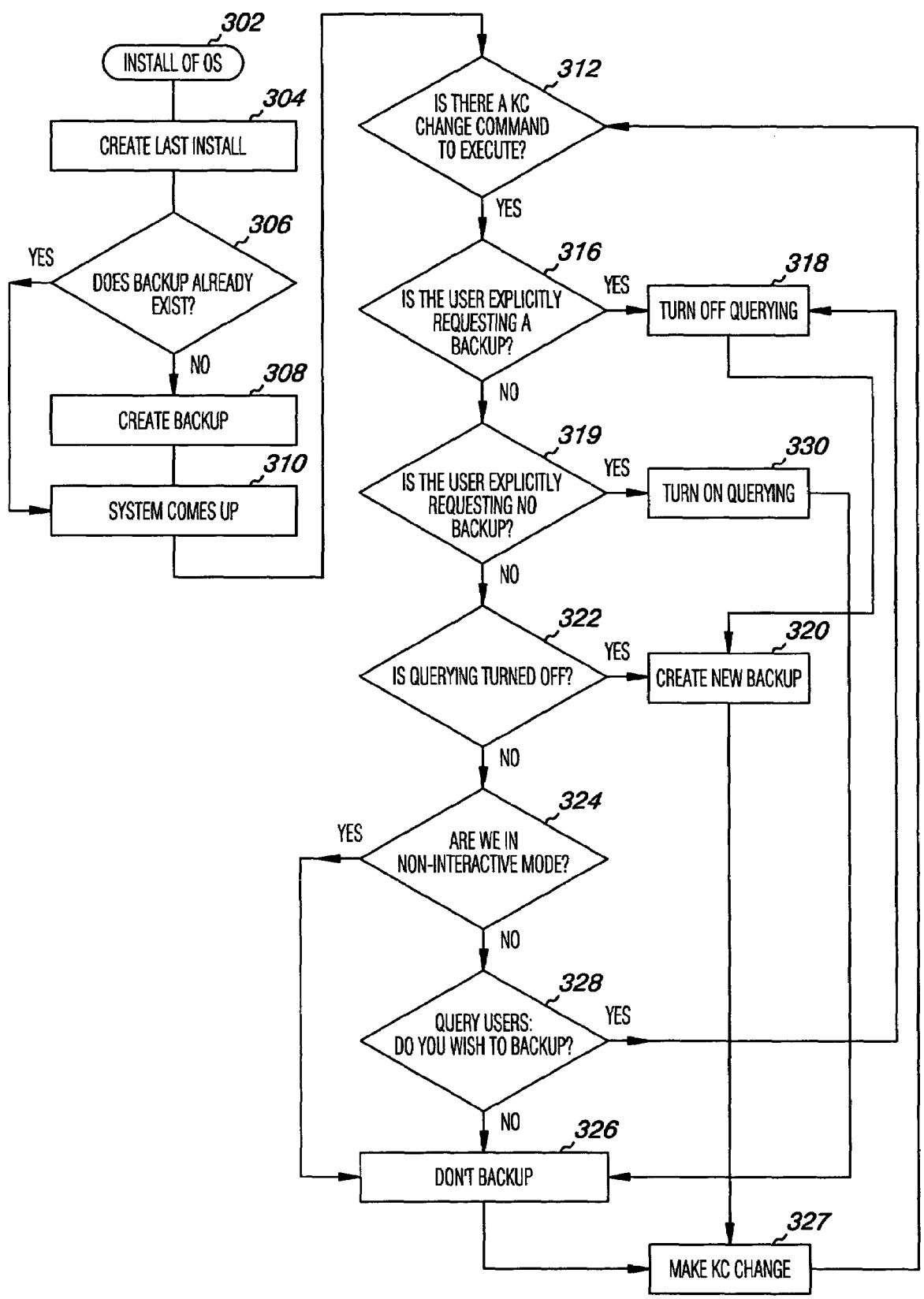
FIG. 3 is a flow chart illustrating kernel configuration change and backup embodiments.

FIG. 3 is a flow chart diagram illustrating last install and kernel configuration change and backup embodiments. The embodiment of FIG. 3 illustrates the installation and/or update (upgrade) of an operating system kernel on a computer system at 302. As mentioned above and shown in FIG. 3, a program embodiment is provided which executes instructions such that after a new kernel has booted successfully at least once, whether in association with an operating system installation or update, the kernel configuration is automatically saved as a "last install" configuration as shown at 304. That is, the program instructions execute with every successful update and/or new install of the operating system kernel. The program embodiments include instructions which can be executed to allow a system user to go back to a kernel configuration which was last successfully installed. In creating the last install kernel configuration, the program instructions execute to save a successful and working clean kernel configuration, suitable to the user, which none of the user's subsequent system changes will impact, e.g., until a next last install is created. The user can elect to physically change the configuration saved under last install, but no changes are made to this configuration without the user requesting the change. In some cases, the last install configuration is a benefit over backup kernel configurations which can have some of the recent system changes that a user may have made, some of which may be undesirable. As the reader will appreciate, backup kernel configurations have both the benefit and drawback of being overwritten with new changes, sometimes automatically. In contrast, the program embodiments execute to create a last install kernel configuration which remains unchanged unless the user explicitly chooses to change it.

Thus, the last install will be a "known good" kernel configuration and help to avoid issues when a user inadvertently creates a non-bootable kernel configuration and has not created a backup. Without the automatic creation of "last install", it would be possible for a customer to have no valid working kernel configuration as a result of incorrect or misguided kernel configuration changes. The last install may also be particularly useful for customers upgrading to a new version of an operating system kernel since there is the possibility that unfamiliarity with the new kernel configuration tools may result in procedural mistakes.

FIG. 3 further illustrates an embodiment for automatically saving a backup kernel configuration. A program embodiment executes instructions to automatically save a backup kernel configuration as distinguished from the saved last install configuration, i.e., the last install configuration is created with a new install or operating system version update whereas a backup kernel configuration may be created in association with each kernel configuration change. As shown in the embodiment of FIG. 3, upon creation of a last install kernel configuration after a system install and/or update, program embodiments can execute instructions to check whether a backup kernel configuration already exists, as shown at decision block 306. If one already exists, the instructions in the loaded operating system kernel execute to bring up, i.e., bring online, the computer system. If, however, one does not already exist, then the program instructions can execute instructions to create a backup kernel configuration, as shown in block 308.

As shown in FIG. 3, a system administrator can periodically invoke a kernel configuration command, e.g., kconfig, kcmodule, and/or kctune. This is illustrated in FIG. 3 as decision block 312. As shown in the embodiment of FIG. 3, if a kernel configuration change command is invoked the program instructions will begin the process of handling the kernel configuration change command, e.g., read, validate, apply, etc. According to a program embodiment, instructions execute such that the first time a user makes a kernel configuration change, the kernel configuration tools prompt the user, e.g., in the form of a query, as to whether the user wants to save a backup kernel configuration. If the user answers "yes", then program instructions can execute to set an indicator such that this response is applied to all future kernel configuration changes where the user has not selected an explicit option to not backup (as will be described in more detail below). For example, in the above described Unix environment a command line flag –B can be set, and shared between the kernel configuration commands kconfig, kcmodule, and kctune, when the yes response is given.

As shown in the embodiment of FIG. 3, if the user has explicitly requested a backup kernel configuration, e.g., set the –B flag in the kernel configuration command line, then the program instructions will execute to turn off the above querying, as shown at block 318, and execute to create a new backup kernel configuration, as shown at block 320. In the embodiment illustrated in FIG. 3, if the user has not explicitly requested a backup kernel configuration in block 316 the program instructions will execute to check whether the user is explicitly requesting no backup as shown in decision block 319. If the user is explicitly requesting no backup in block 319, the program instructions will execute to turn on querying as shown in block 330, will execute to not make a backup kernel configuration as shown in block 326, and will execute to continue forward to make the kernel configuration (KC) change as shown in block 327. If the user is neither explicitly requesting a backup kernel configuration nor explicitly requesting no backup kernel configuration, the program instructions will execute to check whether the query to users has been turned off either presently or in a prior command line (e.g., in a prior kernel configuration command line revocation) as shown in block 322. If the above querying has been turned off, then the program instructions execute to create the new backup kernel configuration as shown in block 320.

According to various embodiments, the program instructions execute to automatically save the backup kernel configuration by "default" if the user has explicitly requested a backup kernel configuration, e.g., set the –B flag in the kernel configuration command line, and if kernel configuration change commands are called in a non-interactive fashion, e.g., through scripts as the same are known and understood. However, if the user has not explicitly requested a backup kernel configuration in block 316, and if the above querying has not been turned off in a prior command in block 318, then the program instructions execute so that a backup kernel configuration is not automatically created. The implication here is that a user should be asked whether a backup kernel configuration is intended. The ability to query the user depends on the mode in which the kernel configuration change command is invoked. Accordingly, the program instructions execute to check whether the system is running in non-interactive mode and whether the kernel configuration change commands are being called in a non-interactive fashion, e.g. running from a script, as shown in FIG. 3 at block 324, and if so the program instructions execute to not create a new backup kernel configuration as shown in block 326.

As shown in the embodiment of FIG. 3, if the system is running in interactive mode and the kernel configuration change commands are being called in an interactive fashion, then the program instructions execute to query the user whether a backup is desired as shown at block 328. If the user requests a backup then the program instructions execute to "turn off" the querying at block 318, and execute to create a new backup kernel configuration at block 320. If the system is running in interactive mode, the kernel configuration change commands are being called in an interactive fashion, and the user does not request a backup in block 328, then the program instructions execute to "turn on" querying as shown in block 330. As shown in block 326, with querying remaining "turned on", the program instructions execute so as not to create a backup kernel configuration.

With querying turned on, the program instructions will execute such that the kernel configuration tools will prompt the user, e.g., in the form of a query, as to whether the user wants to save a backup kernel configuration each time a kernel configuration change command is received at block 312. As the reader will appreciate, this querying behavior will continue until the user either explicitly requests a backup kernel configuration be saved in block 316 (e.g., sets a –B flag in the kernel configuration command line), or answers "yes" to the query in block 328. When either of these events occurs, program instructions execute to turn off querying as shown in block 318. Querying can be resumed, i.e. turned on, if the user explicitly requests that a backup kernel configuration not be saved in block 319 (e.g., sets a –K flag in the kernel configuration command line as will be discussed in more detail below).

As shown in the embodiment of FIG. 3, once a backup kernel configuration has either been created in block 320, or has not been created in block 326, program instructions will return to the process of handling the kernel configuration change command, e.g., proceed with making the kernel configuration change in block 327. As shown in the embodiment of FIG. 3, the system administrator may continue to periodically invoke kernel configuration commands, e.g., kconfig, kcmodule, and/or kctune, in decision block 312.

As one of ordinary skill in the art will appreciate from FIG. 3, a program embodiment provides a kernel configuration mechanism which has the ability to save a backup of a system's kernel configuration prior to a kernel configuration change being applied, thus affording the ability to reverse the change if it should prove undesirable. Each time the system boots, the system administrator will be queried as to whether a kernel configuration backup is desired. However, once a system administrator sets an indicator (e.g., sets a –B flag in the kernel configuration command line) representing an intention to have automatic saving of backup kernel configurations on the system prior to a kernel configuration change, the backups will be made automatically during each subsequent kernel configuration change.

As the reader will also appreciate upon reading this disclosure, there are situations when a system administrator may prefer that this automatic backup mechanism be disabled, e.g., to avoid kernel configuration changes being applied when kernel configuration change commands are being called in a non-interactive fashion, e.g. running from a script. From the above discussion, the reader will appreciate that in various embodiments once the automated kernel configuration backup feature has been enabled (e.g. a –B flag set), the automatic backup feature will remain in place, even when kernel configuration change commands are being called in a non-interactive fashion, until the system is next shut down. Since many systems operate with the concern for high availability, it may some time before the system is shut down.

Accordingly, a program embodiment is provided that can execute instructions to disable the automatic backup of kernel configuration changes. By way of example and not by way of limitation, in the above described Unix example program instructions can execute to set a –K flag in the kernel configuration command line to be shared by the kernel configuration commands kconfig, kcmodule, and kctune based on user feedback received in response to a customer user interface feedback session. According to various embodiments, once such an indicator has been set, the system will return to a state where kernel configuration backups will not occur until they are explicitly requested, e.g., at block 316. As the reader will appreciate from the embodiment of FIG. 3, program instructions can execute to set such an indicator without having to reboot the system. The embodiments which have been described herein can thus give an administrator improved control over behavior of their systems and can allow an administrator to make a series of configuration changes while retaining the kernel configuration backup, e.g., 306 and/or 308, made before the first change in a series of kernel configuration changes.

Figure 4:
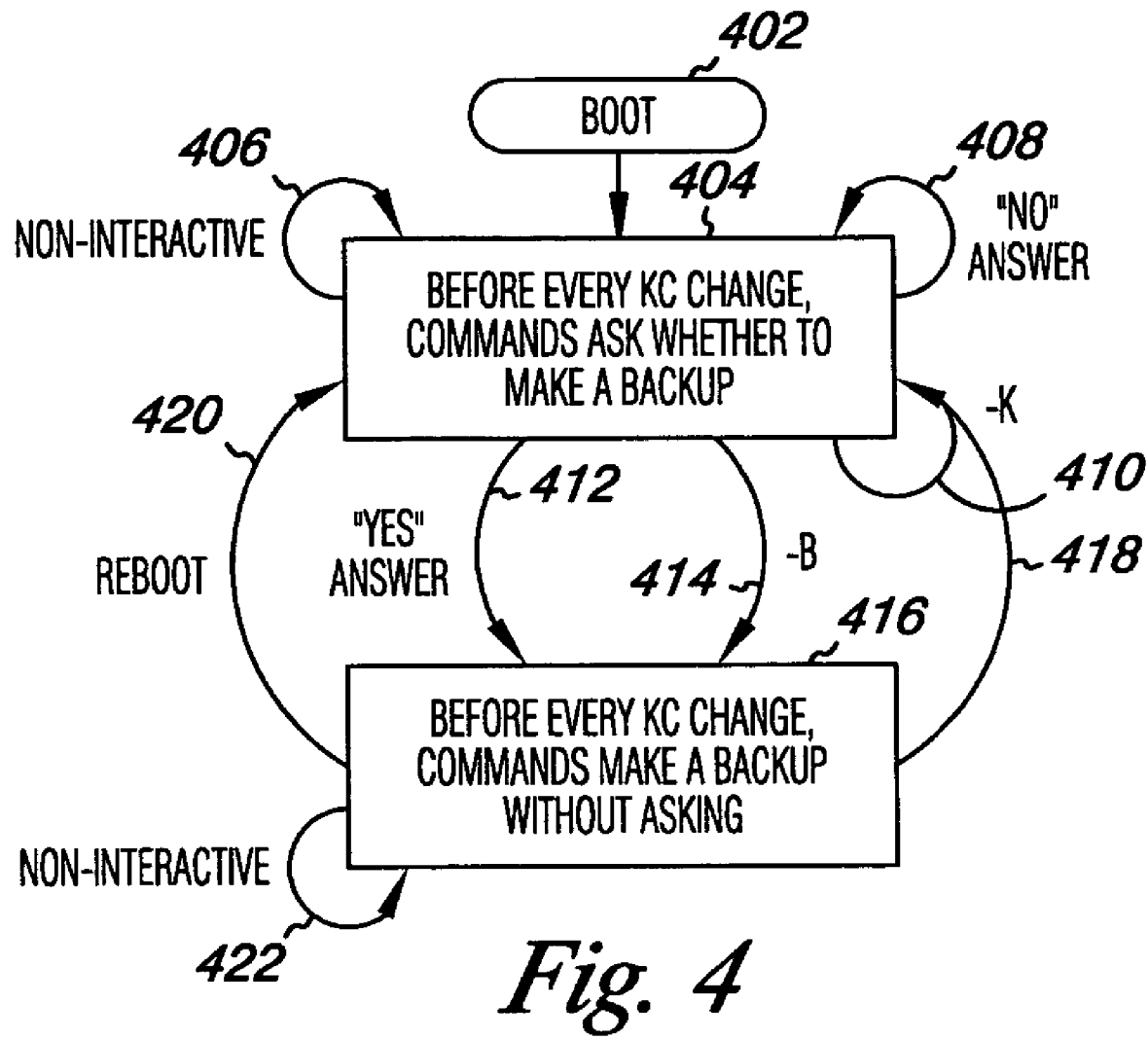
FIG. 4 is a state diagram illustrating kernel configuration change and backup embodiments.

FIG. 4 is a state diagram illustrating kernel configuration change and backup embodiments. The state diagram shown in FIG. 4 is another manner of presenting embodiments which have been described in connection with FIG. 3. FIG. 4 depicts different states and provides an illustrative example of how a system user can move from one state to another using the example embodiments of –B and –K options described herein.

FIG. 4 illustrates state transitions from a time of booting the system, shown at block 402, forward. As shown in block 404, before every kernel configuration change, commands ask (e.g., query a system user) whether to make a backup. As the reader will appreciate, if the kernel configuration change commands are being called in a non-interactive fashion, shown at 406 and 422, program instructions will execute to either automatically save a backup kernel configuration by "default" (422), e.g., as when the user has explicitly requested a backup kernel configuration such as by a set –B flag in the kernel configuration command line, or to not create a new backup kernel configuration (406), e.g., when the user has not explicitly requested a backup kernel configuration either through not setting the –B flag or by having set a –K flag in the kernel configuration command line.

As shown in FIG. 4, if a system user responds to the backup query in the negative, as shown at 408, then the program instructions execute the above query again before the next kernel configuration change at 404. If the system user sets an indicator representing an intent not to automatically save a backup of kernel configurations, e.g., has set a –K flag as shown at 410, then the program instructions execute to query again before the next kernel configuration change at 404.

As shown in FIG. 4, if a system user responds to the backup query in the positive, as shown at 412, or explicitly requests to automatically save a backup of kernel configurations, e.g., has set a –B flag as shown at 414, then the program instructions execute to automatically save a backup of kernel configurations before every kernel configuration change going forward without re-posing the query, as shown at block 416.

As shown in the embodiment of FIG. 4, the system will continue to operate in this manner until either the system user sets an indicator representing an intent not to automatically save a backup of kernel configurations, e.g., resets a –K flag as shown at 418, or the system is rebooted, as shown at 420.

Figure 5:
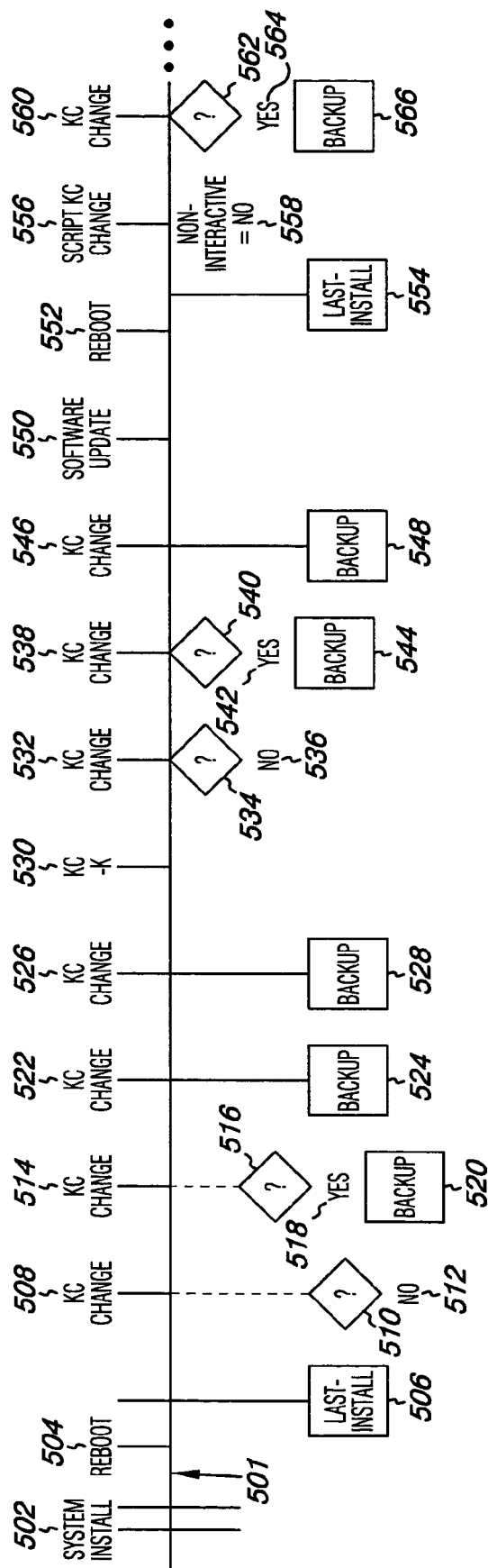
FIG. 5 is an event diagram illustrating kernel configuration change and backup embodiments.

FIG. 5 is an event diagram illustrating kernel configuration change and backup embodiments. The event diagram shown in FIG. 5 is another manner of presenting embodiments which have been described in connection with FIG. 3. That is, FIG. 5 illustrates a similar concept as shown in FIGS. 3 and 4 about how backup and querying works according to various embodiments described herein. In the example embodiment of FIG. 5, the use of the above mentioned –B flag is not illustrated.

In FIG. 5, events above the bar 501 illustrate where kernel configuration changes have been requested. The area below the bar 501 illustrates what events occur when the kernel configuration request come in (as far as backup is concerned) according to program embodiments described herein. Further, in FIG. 5, the "?" is intended to mean that the system user is queried. The "yes" or "no" under the "?" is the answer to the question "do you want to backup?".

The event diagram embodiment of FIG. 5 illustrates a series of events from a system install, shown at 502, forward. As discussed above in connection with FIG. 3, a program embodiment is provided which executes instructions such that after a new kernel has booted successfully at least once (shown at 504), whether in association with an operating system installation or update, a kernel configuration is automatically saved as a "last install" configuration as shown at 506. At 504, a system reboot event is illustrated as can be performed by a system administrator.

At 508, a kernel configuration (KC) change, e.g., a kernel configuration change command, is received such as at decision block 312 in FIG. 3. Because the system administrator has not explicitly requested to save a backup of kernel configurations or explicitly set an indicator, e.g., set a –B flag in the kernel configuration command line representing an intent to automatically save a backup kernel configuration, program instructions execute to query whether the system user wants to save a backup kernel configuration, as shown at 510. In this example event, the system user responds in the negative, i.e., "no", at 512, and a backup kernel configuration is not saved.

At 514, a KC change is received and at 516 the above described query is again posed to a system user. In this example event, the system user responds in the positive, i.e., "yes", at 518. Accordingly, program instructions execute to save a backup kernel configuration, as shown at 520. Recalling the state diagram discussed in connection with FIG. 4, the program instructions will now go forward with automatically saving a backup kernel configuration before every kernel configuration change is applied, without querying the system user whether a backup is desired. In various embodiments, the program instructions will continue to do so until a system user explicitly requests not to create a new backup kernel configuration, e.g., by setting a –K flag in the kernel configuration command line, or rebooting as shown in FIG. 4. Thus, at 522, a KC change is received and, at 524, the program instructions execute to automatically save a new backup kernel configuration, i.e., overwrite an existing backup kernel configuration. At 526, another KC change is received and again, at 528, the program instructions execute to automatically save a new backup kernel configuration.

At 530, a KC change is received along with a system user explicitly requesting not to create a new backup kernel configuration, e.g., by setting a –K flag in the kernel configuration command line. Recalling the state diagram discussed in connection with FIG. 4, the program instructions will now return to querying a system user each time a KC change is received (e.g., as illustrated by 418 and 410 in FIG. 4), before saving a backup kernel configuration. The program instructions will continue to do so until a system user explicitly requests to create a new backup kernel configuration, or explicitly sets an indicator, e.g., as illustrated by 412 and 414 in FIG. 4. Thus, at 532, a KC change is received and, at 534, program instructions execute to query a system user whether a backup is desired. In this example event, the system user responds in the negative, i.e., "no", at 536, and a backup kernel configuration is not saved.

At 538, a KC change is received and, at 540, the above described query is again posed to a system user. In this example event, the system user responds in the positive, i.e., "yes", at 542. Accordingly, program instructions execute to save a backup kernel configuration as shown at 544. Once again recalling the state diagram discussed in connection with FIG. 4, due to the system user's affirmative response, at 542, to the query, at 540, the program instructions will now go forward with automatically saving a backup kernel configuration before every kernel configuration change is applied, without querying the system user whether a backup is desired. Thus, at 546, a KC change is received and, at 548, the program instructions execute to automatically save a new backup kernel configuration.

At 550, a software update event is illustrated. As described in connection with FIG. 3's discussion of operating system kernel installs and updates, a program embodiment can execute instructions upon the occurrence of this event to create a last install kernel configuration as shown at 554. That is, after a software update to the kernel has booted successfully at least once (shown at 552), the kernel configuration is automatically saved as a "last install".

At 556, a script kernel configuration (KC) change is received. This example event is used to illustrate the program instructions executing to query whether a kernel configuration change command is being called in a non-interactive fashion, e.g., running from a script, e.g., as shown in block 324 of FIG. 3. As described in connection with FIG. 3, program instructions execute to automatically save the backup kernel configuration by "default", if the user has explicitly requested a backup kernel configuration, e.g., set the –B flag, when the kernel configuration change command is called in a non-interactive fashion. Likewise, however, if the user has not explicitly requested a backup kernel configuration, e.g., in block 316 of FIG. 3, or has not set an indicator requesting a backup, e.g., has not set a –B flag, and if the above querying has not been turned off, e.g., in block 318 of FIG. 3, then the program instructions execute to check whether the system is running in non-interactive mode and whether kernel configuration change commands are being called in a non-interactive fashion, e.g. running from a script as shown in FIG. 3 at block 324, and if so the program instructions execute to not create a new backup kernel configuration as shown in block 326.

With the KC change example event 556, the system user has neither explicitly requested a backup kernel configuration, nor is the kernel configuration change command being called in a non-interactive fashion as illustrated at 558. As discussed in connection with FIG. 3, if the system is not running in non-interactive mode, e.g., the kernel configuration change commands are not being called in a non-interactive fashion, the program instructions execute so as not to create a backup kernel configuration. Thus, in connection with the KC change example event 556, program instructions execute such that a backup kernel configuration is not saved. As shown in FIG. 5, at a next KC change event 560, program instructions execute to query the system user at 562. In this example event, the system user responds in the positive at 564. Accordingly, program instructions execute to save a backup kernel configuration as shown at 566. And, based on this positive system user response, the program instructions will now go forward with once again automatically saving a backup kernel configuration before every kernel configuration change is applied, without querying the system user whether a backup is desired.

Figure 6:
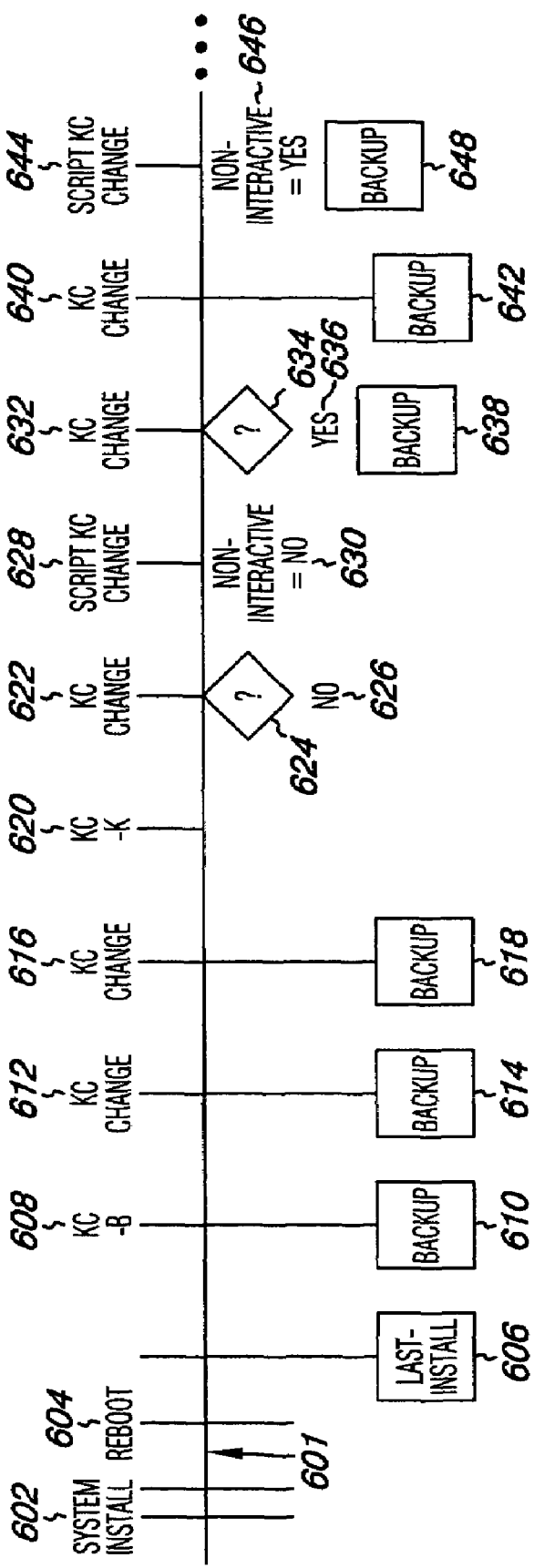
FIG. 6 is another event diagram illustrating kernel configuration change and backup embodiments.

FIG. 6 is another example event diagram illustrating kernel configuration change and backup embodiments. Analogous to FIG. 5, the event diagram shown in FIG. 6 is another manner of presenting embodiments which have been described in connection with FIG. 3. That is, FIG. 6 illustrates similar concepts, as shown in FIGS. 3 and 4, on how backup and querying works according to various embodiments described herein. The example embodiment of FIG. 6 illustrates the use of the above mentioned −B flag. The example embodiment of FIG. 6 also depicts how program embodiments perform in non-interactive mode and how the action will vary depending on whether or not the system is executing to automatically save a backup of kernel configuration, or not.

In FIG. 6, events above the bar 601 illustrate where kernel configuration changes have been requested. The area below the bar 601 illustrates what events occur when the kernel configuration request come in, according to program embodiments described herein. In FIG. 6, the "?" is again intended to mean that the system user is queried, and the "yes" or "no" under the "?" is the answer to the question "do you want to backup?".

The event diagram embodiment of FIG. 6 illustrates a series of events from a system install, shown at 602, forward. As discussed above in connection with FIG. 3, a program embodiment is provided which executes instructions such that, after a new kernel has booted successfully at least once (shown as 604), whether in association with an operating system installation or update, a kernel configuration is automatically saved as a "last install", as shown at 606.

At 608, a kernel configuration (KC) change is received along with a system user explicitly requesting to create a new backup kernel configuration, e.g., by setting a −B flag in the kernel configuration command line. Recalling the state diagram discussed in connection with FIG. 4 (e.g., 414 and 416), program instructions will execute to now go forward with automatically saving a backup kernel configuration before every kernel configuration change is applied, without querying the system user whether a backup is desired. Thus, at 610, the program instructions execute to automatically save a new backup kernel configuration.

At 612, a KC change is received and, since the system user has explicitly requested to create a new backup kernel configuration, e.g., by setting a −B flag in the kernel configuration command line, the program instructions execute to automatically save a new backup kernel configuration, at 614. At 616, another KC change is received and again, at 618, the program instructions execute to automatically save a new backup kernel configuration.

At 620, a KC change is received along with a system user explicitly requesting not to create a new backup kernel configuration, e.g., by setting a −K flag in the kernel configuration command line. Recalling the state diagram discussed in connection with FIG. 4, the program instructions will execute to now return to querying a system user each time a KC change is received (e.g., as illustrated by 418 and 410 in FIG. 4), before saving a backup kernel configuration. The program instructions will continue to do so until a system user explicitly requests to create a new backup kernel configuration, or explicitly sets an indicator, e.g., as illustrated by 412 and 414 in FIG. 4.

At 622, a KC change is received and, as noted above, the program instructions will query the system user whether a backup kernel configuration is desired, as shown at 624. In this example event, the system user responds in the negative, i.e., "no", at 626, and a backup kernel configuration is not saved.

At 628, a script KC change, as the same will be known and understood by one of ordinary skill in the art, is received. This example event is used to illustrate how the program embodiments will perform when a kernel configuration change command is being called in a non-interactive fashion, e.g., running from a script, and how the action will vary depending on whether or not the system is executing to automatically save a backup of kernel configuration, or not. As described in connection with FIG. 3, program instructions execute to automatically save the backup kernel configuration by "default" if the user has explicitly requested a backup kernel configuration, e.g., set the −B flag, when the kernel configuration change command is called in a non-interactive fashion. Likewise, however, if the user has not explicitly requested a backup kernel configuration, e.g., in block 316 of FIG. 3, or has not set an indicator requesting a backup, e.g., has not set a −B flag, and if the above querying has not been turned off, e.g., in block 318 of FIG. 3, then the program instructions execute to check whether the system is running in non-interactive mode and whether kernel configuration change commands are being called in a non-interactive fashion, e.g. running from a script as shown in FIG. 3 at block 324, and if so the program instructions execute to not create a new backup kernel configuration as shown in block 326.

With the KC change example event 628, the system user has neither explicitly requesting a backup kernel configuration, nor is the system running in non-interactive mode, as illustrated at 630. As discussed in connection with FIG. 3, if the system is not running in non-interactive mode, the program instructions execute to "turn on" querying as shown in block 330 of FIG. 3. As shown in block 326 of FIG. 3, with querying "turned on", the program instructions execute so as not to create a backup kernel configuration. Thus, in connection with the KC change example event 628, program instructions execute such that a backup kernel configuration is not saved and the querying remains turned on.

At 632, a KC change is received and the program instructions execute to query the system user at 634. In this example event, the system user responds in the positive, i.e., "yes" at 636. Accordingly, program instructions execute to save a backup kernel configuration, as shown at 638. As described herein, based on this positive system user response, the program instructions will now go forward with once again automatically saving a backup kernel configuration before every kernel configuration change is applied, without querying the system user whether a backup is desired. Thus, at 640, a KC change is received and, at 642, the program instructions execute to automatically save a new backup kernel configuration.

At 644, a script KC change is again received. As noted previously, the program instructions execute to automatically save the backup kernel configuration by "default", if the user has explicitly requested a backup kernel configuration, e.g., set the −B flag, during a period when the kernel configuration change command is being called in a non-interactive fashion. And, as described above, if the user has not explicitly requested a backup kernel configuration, or has not set an indicator requesting a backup, e.g., has not set a −B flag, and if the above querying has not been turned off, then the program instructions will execute to check whether the system is running in non-interactive mode and whether kernel configuration change commands are being called in a non-interactive fashion, e.g. running from a script, and if so the program instructions execute to not create a new backup kernel configuration.

With the script KC change example event 644, the system user has previously, explicitly requested a backup kernel configuration in event 636 and the system running in non-interactive mode, as illustrated at 646. Accordingly, in connection with the script KC change example event 644, the program instructions execute to save a backup kernel configuration, as shown at 648, before the kernel configuration change is applied. As the reader will appreciate, the program instructions will execute to continue automatically saving a backup kernel configuration before every future kernel configuration change is applied, without querying the system user whether a backup is desired. The program instructions will continue to do so until a system user explicitly requests not to create a new backup kernel configuration, or the system administrator reboots the system, e.g., 418 and 420 in FIG. 4.

Figure 7A:
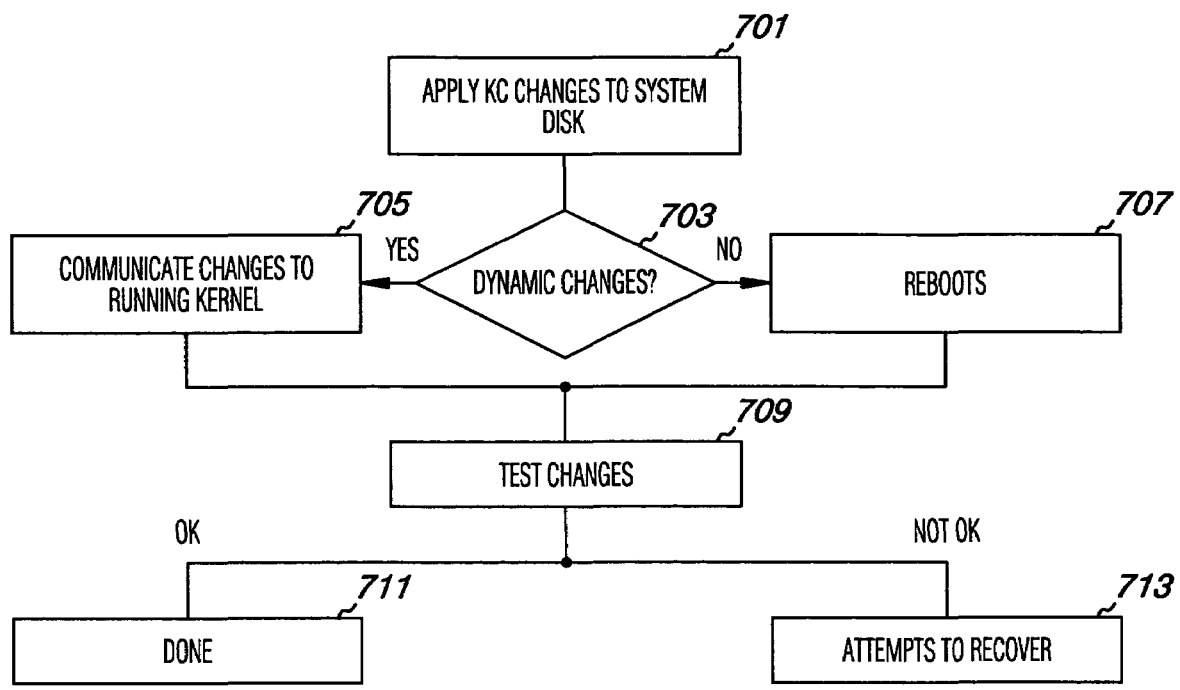
FIGS. 7A and 7B illustrate a previous approach to kernel configuration changes and an embodiment for an alternate root kernel configuration change.
Figure 7B:
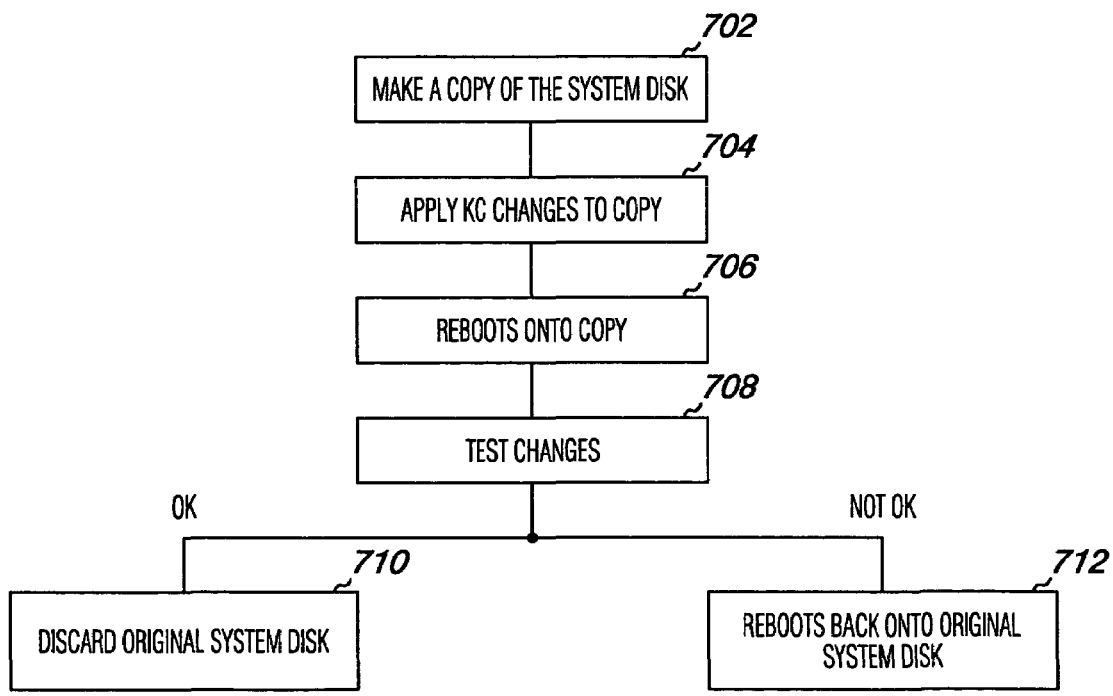

FIGS. 7A and 7B illustrate a previous approach to kernel configuration changes, as well as an embodiment for an alternate root kernel configuration change. As noted earlier, a program embodiment is included which provides an alternate root to apply kernel configuration changes.

FIG. 7A illustrates a process of making a KC change without the alternate root program embodiment. As shown in previous approach of FIG. 7A, kernel configuration changes are applied to the system disk that is in use by the system at 701. As noted earlier, some kernel configuration changes can be applied dynamically to the kernel while the system is running, and others cannot. For one example, reference is made to copending application entitled, "Dynamic Kernel Tunables", application Ser. No. 10/875,289, filed on Jun. 7, 2001, assigned to the instant assignee, and incorporated by reference. Accordingly, as shown at decision block 703, program instructions execute to check whether the kernel configuration change is a dynamic change. If the kernel configuration change is a dynamic change that can be made to the running system, the program instructions will execute to communicate the changes to the running kernel, as shown at block 705. If the kernel configuration change is not a dynamic change, the system administrator will have to reboot the system for program instructions to communicate the changes to the kernel, as shown at block 707.

Once the kernel configuration changes have been applied to the kernel, the system administrator can test the newly applied kernel configuration changes, as shown at block 709. In this previous approach, if the kernel configuration changes were satisfactory, i.e., okay, then the process would be complete, i.e., done, as shown in block 711. If, however, the kernel configuration changes were not satisfactory, i.e., not okay, then the system administrator would have to attempt to recover a working kernel configuration, e.g., attempt to load a known good configuration, as shown at block 713. In this previous approach, the kernel configuration system disk copy from before the applied kernel configuration changes would no longer be available. The system administrator may be able to recover using one of the other program embodiments described in this disclosure. There is sometimes a risk that a kernel configuration change may install a new kernel module which will misbehave and wipe out the system disk, in which case these other previously discussed recovery mechanisms may not succeed.

FIG. 7B illustrates a solution to this scenario. The embodiment of FIG. 7B describes a similar scenario as 7A, but with the addition of using an alternate root program embodiment for installs. In FIG. 7B a program embodiment is provided which executes instructions to make a copy of one or more key file systems of a running system, as shown at block 702. In various embodiments, the program instructions first execute to make a copy of the entire system disk.

At block 704, program instructions execute to apply kernel configuration changes to the copy. The system can be restarted using the kernel configuration changes on the copy, as shown at block 706. That is, the system is rebooted using the copy as the new system disk. The system administrator can then test the copy which has the newly applied kernel configuration changes, as shown at block 708. If the kernel configuration changes on the copy are satisfactory, i.e., okay, then program instructions can execute to discard the original kernel configuration system disk, as shown in block 710. If, however, the kernel configuration changes are not satisfactory, i.e., not okay, as applied to the copy of the system disk, then the system administrator can execute program instructions to reboot back onto the original system disk. Hence, if issues arise, the program instructions can execute to restart the system using the one or more key file systems from which the copy was originally made.

Figure 8:
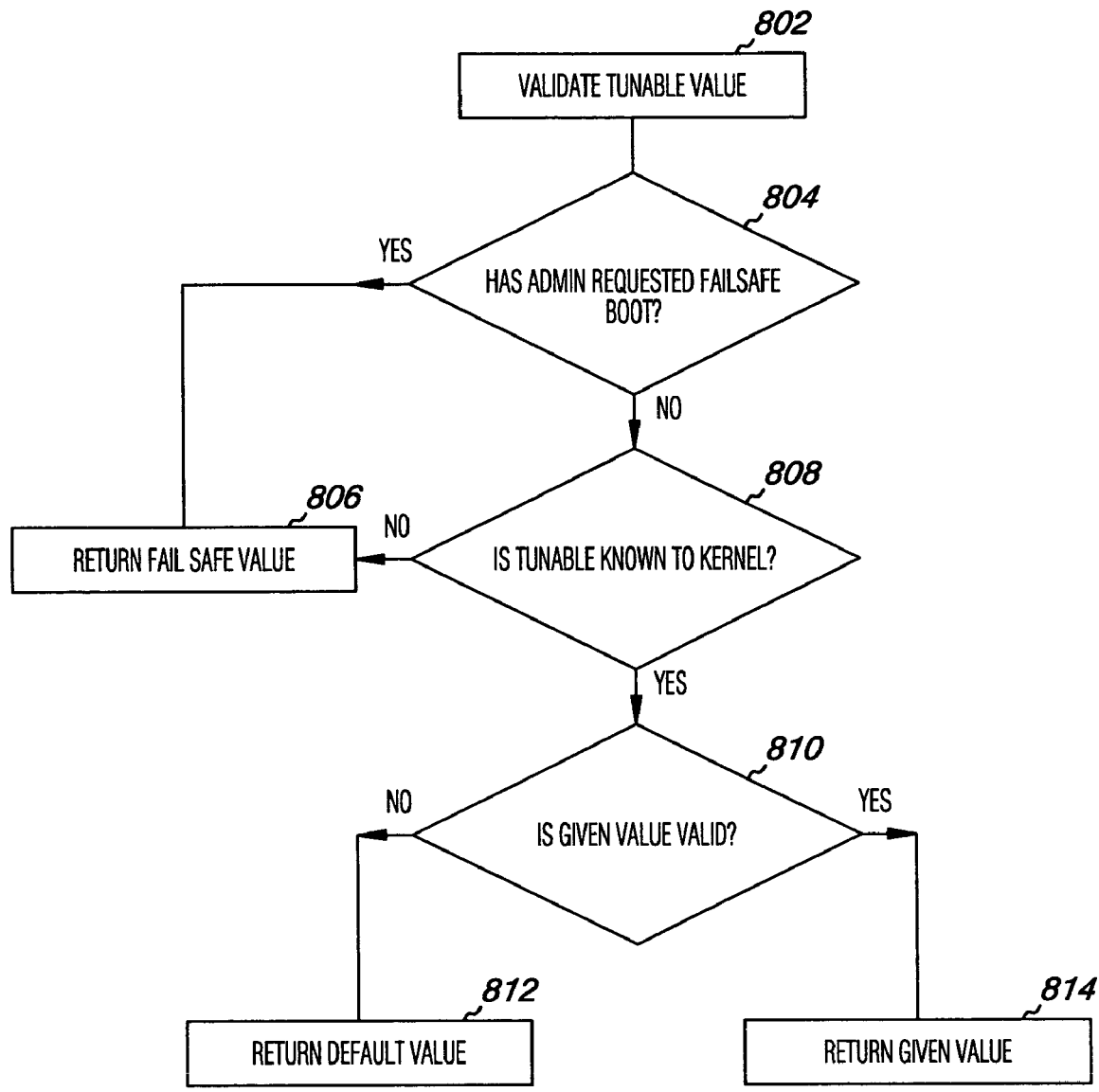
FIG. 8 illustrates an embodiment for booting a kernel configuration in a failsafe mode.

FIG. 8 illustrates one example embodiment for booting a kernel configuration in a failsafe mode. As noted earlier, a program embodiment is provided which executes instructions to facilitate a failsafe boot mode. Program instructions execute, when booting in a failsafe mode, to provide failsafe values to tunables, to use default device bindings, and to prohibit dynamically loading kernel modules during boot. For example, program embodiments execute instructions, in the failsafe boot mode, to disable loading of kernel modules during boot.

The example embodiment illustrated in FIG. 8 depicts the failsafe boot mode in relation to tunables. That is, FIG. 8 illustrates an execution of the program embodiments to provide tunable failsafe values in the failsafe boot mode. As noted above, however, the program embodiments additionally execute, in the failsafe boot mode, to use default device bindings (not shown in FIG. 8's example), and to prohibit dynamically loading kernel modules during boot (not shown in FIG. 8's example).

At block 802, a validate tunable value request is received. For example, at boot time, each kernel subsystem which owns tunables will ask for the value that it is set to and ask for that value to be validated. At block 804, the program instructions execute to check whether a system user has requested a failsafe boot. For example, in the embodiment of FIG. 8, while retrieving and validating a tunable value the first time in the boot path, program instructions execute to check whether a failsafe boot has been requested. As shown at block 806, if a failsafe boot has been requested, the program instructions execute to return a failsafe value for the tunable. In various embodiments, the failsafe value for the tunable is part of the input data operated on by the program instructions, e.g., coming into this function.

As shown at block 808, if the system administrator has not requested a failsafe boot, the program instructions execute to check whether the kernel knows about this tunable. For example, if the kernel does not know this tunable at all, there would be no way for the kernel to retrieve the tunables value. As shown in the embodiment of FIG. 8, if the kernel does not know about the tunable, the program instructions execute to return the failsafe value for the tunable, as shown at block 806.

If the kernel knows about the tunable, the program instructions execute to retrieve the tunable's value and will execute to validate that value, as shown at block 810. In the embodiment of FIG. 8, program instructions execute to return a default value, if the given value for the tunable is not valid. If the tunable's value is valid, the program instructions execute to return the given value for that tunable, as shown at block 814.

As the reader will appreciate, the program embodiments described in connection with FIGS. 7B and 8, as well as elsewhere in this disclosure, can be provided to the kernel configuration tool illustrated as 228 in FIGS. 2A and 2B. In association with kernel configuration changes, the program embodiments described herein can execute to query and/or change kernel configuration parameters (tunable settings, module state, etc.) in an alternate root and/or a failsafe boot mode.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computer readable storage medium encoded with a program that is executed by a computer to cause a device to perform a method comprising:
    installing a kernel configuration for an operating system;
    creating a last install of the kernel configuration; and
    when making kernel configuration changes, making a copy of a current kernel configuration from a system disk, and applying kernel configuration changes to the copy.

2. The medium of claim 1, the method including checking whether a backup kernel configuration exists.

3. The medium of claim 2, the method including enabling an automatic creation of a backup kernel configuration when one does not already exist.

4. The medium of claim 3, the method including disabling the automatic creation of the backup kernel configuration.

5. The medium of claim 1, the method including booting in a failsafe mode.

6. The medium of claim 5, wherein booting in the failsafe mode includes:
    providing failsafe values to tunables;
    using default device bindings; and
    not dynamically loading kernel modules during boot.

7. The medium of claim 1, the method including rebooting the operating system using the copy as a new system disk.

8. A computer readable storage medium encoded with a program that is executed by a computer to cause a device to perform a method comprising:
    receiving a kernel configuration change;
    checking whether an automatic backup has been enabled; and
    when a backup kernel configuration is not selected, not creating a new backup configuration and enabling a query going forward as to whether the backup kernel configuration is intended with subsequent kernel configuration changes.

9. The medium of claim 8, the method including, when the automatic backup has been enabled, disabling a query as to whether a backup kernel configuration is intended and creating a new backup kernel configuration.

10. The medium of claim 9, wherein creating the new backup kernel configuration includes overwriting an existing backup kernel configuration.

11. The medium of claim 8, the method including checking whether a query, relating to whether a backup kernel configuration is intended, is turned off.

12. The medium of claim 11, the method including, when the query has been turned off, creating a new backup kernel configuration.

13. The medium of claim 12, the method including checking whether a system is running in a non-interactive mode.

14. The medium of claim 13, the method including not creating the new backup kernel configuration when the system is running in the non-interactive mode and the query is turned on.

15. The medium of claim 8, the method including, when the automatic backup has not been enabled, querying whether a backup kernel configuration is intended.

16. The medium of claim 15, the method including, when a backup kernel configuration is selected, disabling a query as to whether the backup configuration is intended and enabling the automatic backup.

17. The medium of claim 8, the method including reading a flag in a kernel configuration command line to disable the automatic backup and to enable a query wine forward as to whether the backup kernel configuration is intended with subsequent kernel configuration changes.

18. A computer readable medium storage medium encoded with a program that is executed by a computer to cause a device to perform a method comprising:
    receiving a kernel configuration change;
    checking whether an automatic backup has been enabled and, when the automatic backup has been enabled, disabling a query as to whether a backup kernel configuration is intended and automatically creating a new backup configuration for each kernel configuration change; and
    reading a flag in a kernel configuration command line to disable the automatic backup and to enable a query going forward as to whether the backup kernel configuration is intended with subsequent kernel configuration changes.

19. The medium of claim 18, wherein creating a new backup configuration includes overwriting an existing backup kernel configuration.

20. The medium of claim 18, the method including checking whether a query, relating to whether the backup kernel configuration is intended, is turned off.

21. The medium of claim 20, the method including, when the query has been turned off, automatically creating a new backup kernel configuration.

22. The medium of claim 21, the method including checking whether a system is running in a non-interactive mode, 23. The medium of claim 22, the method including not creating a new backup kernel configuration when the system is running in the non-interactive mode and the query is turned on.

24. The medium of claim 18, the method including, when the automatic backup has not been enabled, querying whether the backup kernel configuration is intended.

25. A computer readable storage medium encoded with a program that is executed by a computer cause a device to perform a method comprising:
   when making kernel configuration changes, making a copy of a kernel configuration from an original system disk; and
   applying a kernel configuration change to the copy.

26. The medium of claim 25, the method including rebooting an operating system using the copy as a new system disk.

27. The medium of claim 26, the method including testing the kernel configuration change and when testing is successful discarding the original system disk.

28. The medium of claim 27, the method including, when testing is unsuccessful, rebooting back onto the original system disk.

29. A computer readable storage medium encoded with a program that is executed by a computer to cause a device to perform a method comprising:
   when making kernel configuration changes, making a copy of a kernel configuration from an original system disk;
   applying a kernel configuration change to the copy;
   rebooting an operating system using the copy as a new system disk;
   testing the kernel configuration change;
   when testing is satisfactory, discarding the original system disk; and
   when testing is unsatisfactory, rebooting back onto the original system disk.

30. A kernel configuration tool, comprising:
   a processor;
   a memory coupled to the processor; and
   program instructions provided to the memory and executable by the processor to:
      install a kernel configuration for an operating system;
      automatically create a last install of the kernel configuration when the kernel configuration has booted successfully at least once and automatically save a new kernel configuration as the last install when an updated kernel has booted successfully at least once; and
      when making kernel configuration changes, making a copy of a current kernel configuration from a system disk, and applying kernel configuration changes to the copy.

31. The tool of claim 30, wherein the program instructions can execute to check whether a backup kernel configuration exists and can execute to enable an automatic creation of a backup kernel configuration when one does not already exist.

32. The tool of claim 31, wherein the program instructions can execute to disable the automatic creation of the backup kernel configuration.

33. The tool of claim 30, wherein the program instructions can execute to boot in a failsafe mode when requested by a system user, and wherein, when booting in the failsafe mode, the program instructions can execute to:
   provide failsafe values to tunables;
   use default device bindings; and
   prohibit dynamically loading kernel modules during boot.

34. The tool of claim 30, wherein the program instructions can execute to make a copy of a current kernel configuration from a system disk and can execute to apply kernel configuration changes to the copy when making kernel configuration changes.

35. The tool of claim 34, wherein the program instructions can execute to reboot the operating system using the copy as a new system disk.

36. A kernel configuration tool, comprising:
   a processor;
   a memory coupled to the processor; and
   program instructions provided to the memory and executable by the processor to:
      when making kernel configuration changes, make a copy of a kernel configuration from an original system disk;
      apply a kernel configuration change to the copy;
      reboot an operating system using the copy as a new system disk;
      test the kernel configuration change;
      when testing is satisfactory, discard the original system disk; and
      when testing is unsatisfactory, reboot back onto the original system disk.

37. A kernel configuration tool, comprising:
   a processor;
   a memory coupled to the processor; and
   program instructions provided to the memory and executable by the processor to:
      receive a kernel configuration change; and
      check whether an automatic update to a backup configuration has been enabled, wherein when the automatic update to the backup configuration has been enabled the program instructions execute to disable a query as to whether the backup configuration is intended and execute to create a new backup configuration, and wherein when the backup configuration is not selected the program instructions execute to not create the new backup and execute to enable the query for subsequent kernel configuration changes.

38. The tool of claim 37, wherein the program instructions can execute to disable the query and can execute to automatically create a new backup configuration going forward when the backup configuration is selected.

39. The tool of claim 37, wherein, when creating a new backup configuration, the program instructions can execute to overwrite an existing backup configuration.

40. The tool of claim 37, wherein the program instructions can execute to check whether a query, relating to whether the backup configuration is intended, is turned off.

41. The tool of claim 40, wherein the program instructions can execute to automatically create a new backup configuration when the query has been turned off.

42. The tool of claim 40, wherein the program instructions can execute to check whether a system is running in a non-interactive mode and can execute to not create a new backup configuration when the system is running in the non-interactive mode and the query is turn on.

43. A kernel configuration system, comprising:
   a kernel configuration tool;
   a system file accessible by the kernel configuration tool; and
   a computer readable storage medium encoded with a program that is executed by a computer to cause the kernel configuration tool to, when making kernel configuration changes, make a copy of a current kernel configuration from a system disk and apply kernel configuration changes to the copy in order to recovering kernel configurations without the use of a manually created backup kernel configuration.

44. The system of claim 43, wherein the system includes a computer readable storage medium encoded with a program that is executed by a computer to cause the kernel configuration tool to recover kernel configurations following:

a system update;
a new install;
a kernel configuration change; and
a post boot change.

* * * * *

UNITED STATES PATENT AND TRADEMARK OFFICE
CERTIFICATE OF CORRECTION

PATENT NO. : 7,467,328 B2  Page 1 of 1
APPLICATION NO. : 10/934506
DATED : December 16, 2008
INVENTOR(S) : Steven T. Roth et al.

It is certified that error appears in the above-identified patent and that said Letters Patent is hereby corrected as shown below:

In column 17, line 61, in Claim 6, after "claim 5" delete "." and insert -- , --, therefor.

In column 18, line 40, in Claim 17, delete "wine" and insert -- going --, therefor.

In column 18, line 43, in Claim 18, after "readable" delete "medium".

In column 18, line 67, in Claim 22, after "mode" delete "," and insert -- . --, therefor.

In column 19, line 9, in Claim 25, after "computer" insert -- to --.

In column 20, line 67, in Claim 43, delete "recovering" and insert -- recover --, therefor.

Signed and Sealed this

Fourth Day of August, 2009

JOHN DOLL
*Acting Director of the United States Patent and Trademark Office*